United States Patent [19]

Kral

[11] Patent Number: 5,036,986

[45] Date of Patent: Aug. 6, 1991

[54] BICYCLE STAND

[75] Inventor: Albertus J. Kral, Niagara Falls, Canada

[73] Assignee: Elbon Group, Richmond Hill, Canada

[21] Appl. No.: 387,804

[22] Filed: Aug. 1, 1989

[51] Int. Cl.⁵ .............................................. A47F 7/00
[52] U.S. Cl. ......................................... 211/22; 211/20
[58] Field of Search ..................... 211/20, 22; 248/346

[56] References Cited

U.S. PATENT DOCUMENTS

| 278,616 | 4/1985 | Collison et al. | D12/115 |
| 2,717,084 | 9/1955 | Groenendal | 211/20 |
| 3,599,798 | 8/1971 | Osborn | 211/20 |
| 3,942,646 | 3/1976 | Nelson et al. | 211/5 |
| 4,050,583 | 9/1977 | Szabo | 211/20 |
| 4,306,660 | 12/1981 | Livingston | 211/20 |

FOREIGN PATENT DOCUMENTS 2850763 5/1979 Fed. Rep. of Germany ........ 211/22

Primary Examiner—Robert W. Gibson, Jr.
Attorney, Agent, or Firm—Bean, Kauffman & Spencer

[57] ABSTRACT

This invention relates to an improved, low profile, lightweight, durable, expandable bicycle stand, which holds one or more bicycles, having a wide variety of tire sizes, securely in an upright position. The device of the invention provides one or more optionally interlocking, unitary hollow bodies having bicycle wheel retaining slots vertically disposed therethrough, which retaining slots are tapered, at one or both distal ends to accept and hold a resilient tire therebetween. The hollow bodies have a filling means, and can be at least partially filled with fluid and/or particulate material to weight the stand and increase its stability.

28 Claims, 3 Drawing Sheets

BICYCLE STAND

BACKGROUND OF THE INVENTION

The current awareness of the human need for physical fitness, coupled with the expense, pollution and energy costs of automotive and like alternative transportation devices, has created an increased popularity in the simple bicycle, its manufacture and sale. As the number of bicycles become greater and their use more prolific throughout society, a need has developed for improved bicycle stands that can be efficiently produced, are lightweight in structure, can be easily moved and yet are sturdy enough to withstand abuse while providing secure support to one or more bicycles in an erect position.

One traditional device which has been used to support single bicycles has been the integral kickstand. This device is attached to the bicycle and is kicked into place to support the bicycle, thus gaining its name. Though the device has been in use for years, it has always been seen as an unstable means, suitable for supporting only a single bike on a hard, level surface. The kickstand thus tends to have a limited utility and in many instances a short lifespan because of the abuse it encounters, particularly from the younger bicyclist.

Other bicycle standing devices have also been available for many years. Most, typically involve a complex assembly of multiple elements such as tubular steel frames and the like which require special tools, welding or professional installation by trained technicians. Such devices usually take up a lot of room, are heavy, difficult to move and present a high profile extending well above the ground thus creating significant architectural and landscaping problems. Other bicycle stands have been proposed to be manufactured from very heavy materials, such as concrete, stone and the like, which generally have a lower profile and are meant to support the bicycle by providing a slot for the bicycle wheel to rest in. The latter devices, are also difficult to move once set in place and are usually limited to supporting a single bicycle, having a particular tire size, without adequate provision for the multiple tire sizes typically available in the biking industry.

SUMMARY OF THE INVENTION

This invention relates to an improved, low profile, lightweight, expandable bicycle stand, which supports one or more bicycles, having a wide variety of tire sizes, securely in an upright position. The invention is achieved by providing one or more, optionally interlocking, hollow unitary structures having bicycle wheel retaining slots vertically disposed therethrough, which retaining slots are tapered, at one or both distal ends to accept and hold a resilient tire therebetween. The hollow structures have filling means, and can be at least partially filled with fluid and/or particulate material to weight the stand and increase its stability.

DETAILED DESCRIPTION OF THE PREFERRED EMBODIMENT

Figure 1:
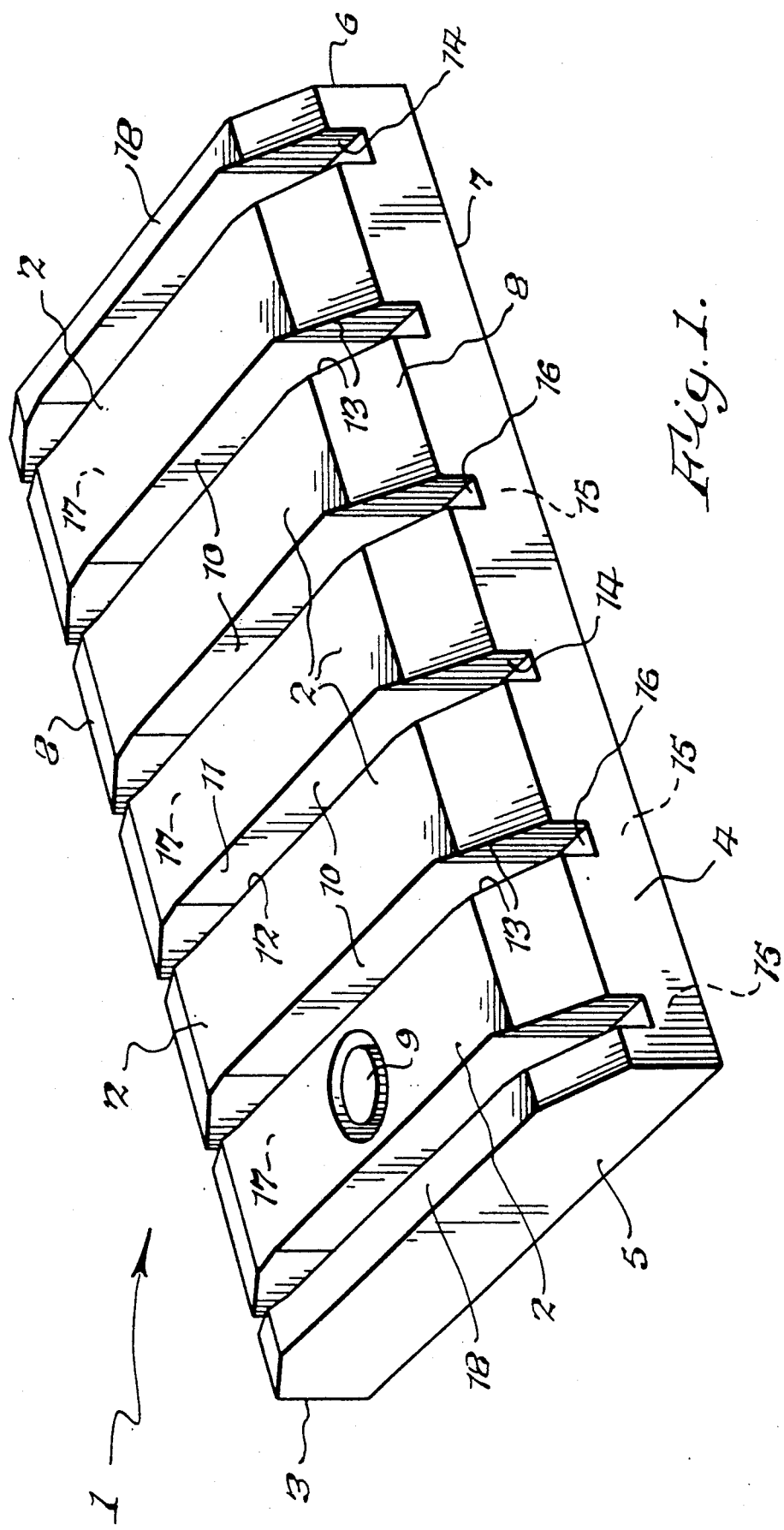
FIG. 1 is a perspective view of a bicycle stand of the invention comprising a single unitary structure.

The bicycle stand of the invention can be in the form of multiple different embodiments, depending upon the particular requirements of use and the number of bicycles to be supported. In one embodiment, as illustrated in FIG. 1, the stand comprises a single unitary structure having several wheel retaining slots. In a further embodiment, as illustrated in FIGS. 2-6, the stand comprises interlocking means for ganging unitary structures.

By the term unitary structure is meant to refer to a hollow body comprising multiple fillable interconnecting chambers in a unit with one or more bicycle wheel retaining slots therein. Preferably, the hollow chambered body of each unit is manufactured from a plastic material such that seams therein are secured and the filling material will be retained therein.

By the term interlocking means is meant that the units comprise means such that two or more units may be ganged together to form a composite of the unitary structures. The interlocking means can be of any suitable design, for example can include loops, holes and the like through which the units can be interlocked by bolts or other attachment means. Preferably, the interlocking means are integral to the structure of the chambered body such that the hollow unitary structures themselves, as a function of their design, interlock to form a composite structure. In FIGS. 2-6, the interlocking means comprises integral slotted female holding means, disposed on one side of the chamber body, and interlocking slotted male holding means disposed on an opposite side. Both the male and female components in this preferred embodiment being a hollow continuation of the chamber body. Thus two or more units can be interlocked and thereby be ganged to form a composite structure.

The following description of the disclosure of the figures relates to preferred embodiments of the invention.

Referring now to FIG. 1, which comprises a perspective view of a unitary structure, bicycle stand of the invention. The stand generally comprises top surface 2, side surfaces 3 and 4, end surfaces 5 and 6, lower surface 7 and beveled surfaces 8 which form the hollow bicycle stand body 1. The structure is filled with flowable material through filling means 9.

Bicycle wheel retaining slots 10 are generally equally inter-spaced from each other, with their length typically extending throughout the width of the top surface of the hollow bicycle stand body 1 and forming multiple interconnected chambers 17 and 18 therein. The wheel retaining slots 10 extend downwardly from the top surface 2 through the hollow body 1 and through the lower surface 7. Wheel retaining slots 10 comprise opposing longitudinal side walls 11 and 12, interconnecting with the top and lower surfaces of the bicycle stand body. The longitudinal side walls are generally parallel throughout the medial portion of their length and taper(bevel) 13 toward each other at the distal ends 14 of the slot 10. The distal ends 14 of the slot 10 are generally open through beveled surfaces 8 and at least a portion of side surfaces 3 and 4, but should not be open through the entire side surface depth. The distal ends 14 of wheel slots 10 of FIG. 1 are open through bevel 8 and the top of side surfaces 5 and 6 thus forming hollow chambers 17 between wheel slots and hollow chambers 18 between wheel slots and the end walls of the hollow bicycle stand body. The lower corners of wheel slots 10 culminate at hollow passageways 15 which interconnect the multiple hollow chambers 17 and 18 comprising fillable hollow bicycle stand body 1. Passageway surface 16 of passageway 15 is angled downwardly from the side surfaces toward the lower surface 7 to allow a bicycle wheel to ride easily into the wheel slots. The slot extends through lower surface 7 of the body to allow drainage of rain water and the like.

Figure 2:
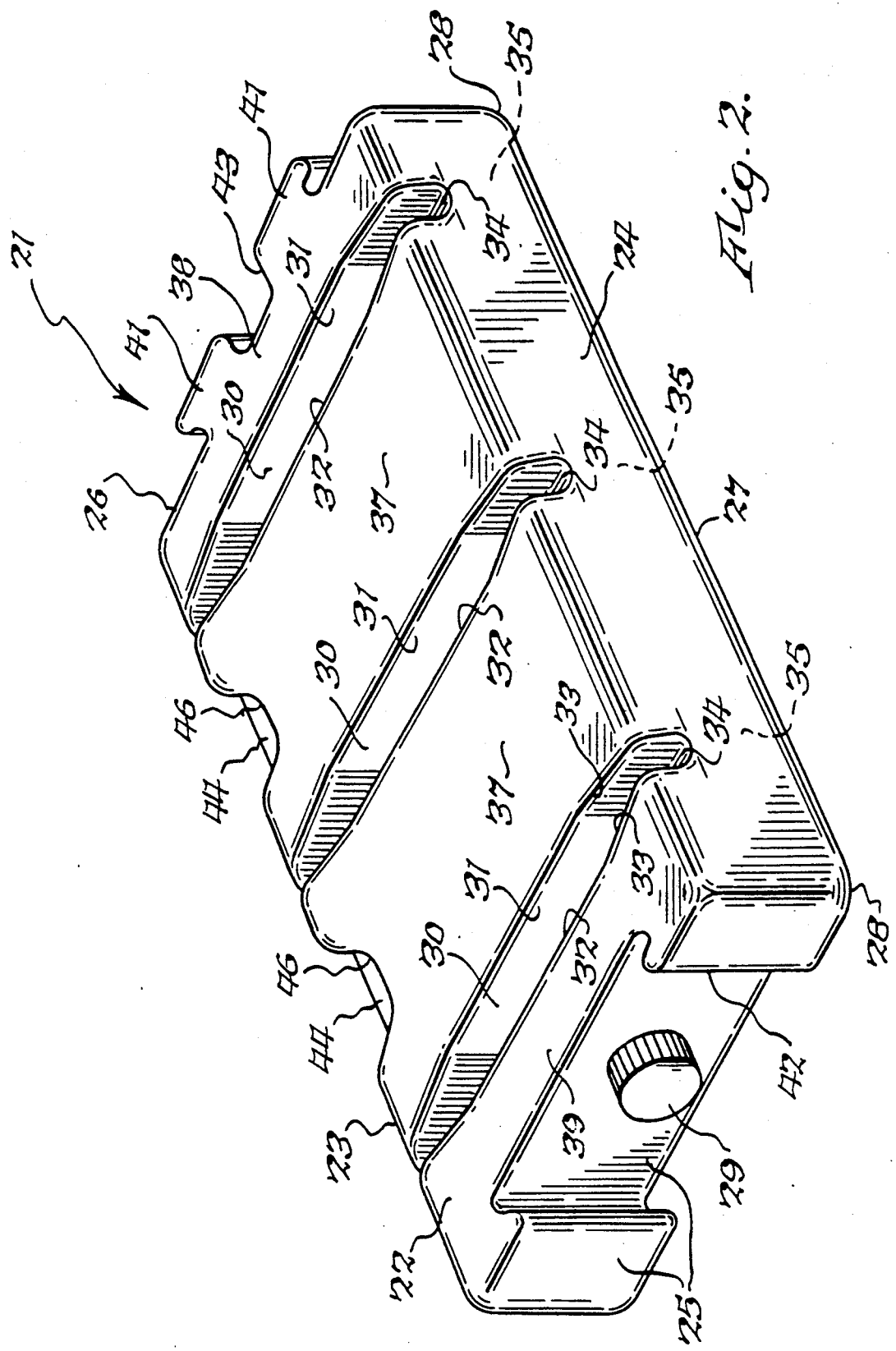
FIG. 2 is a perspective view of a preferred form of the bicycle stand of the invention containing means for interlocking two or more unitary structures.
Figure 3:
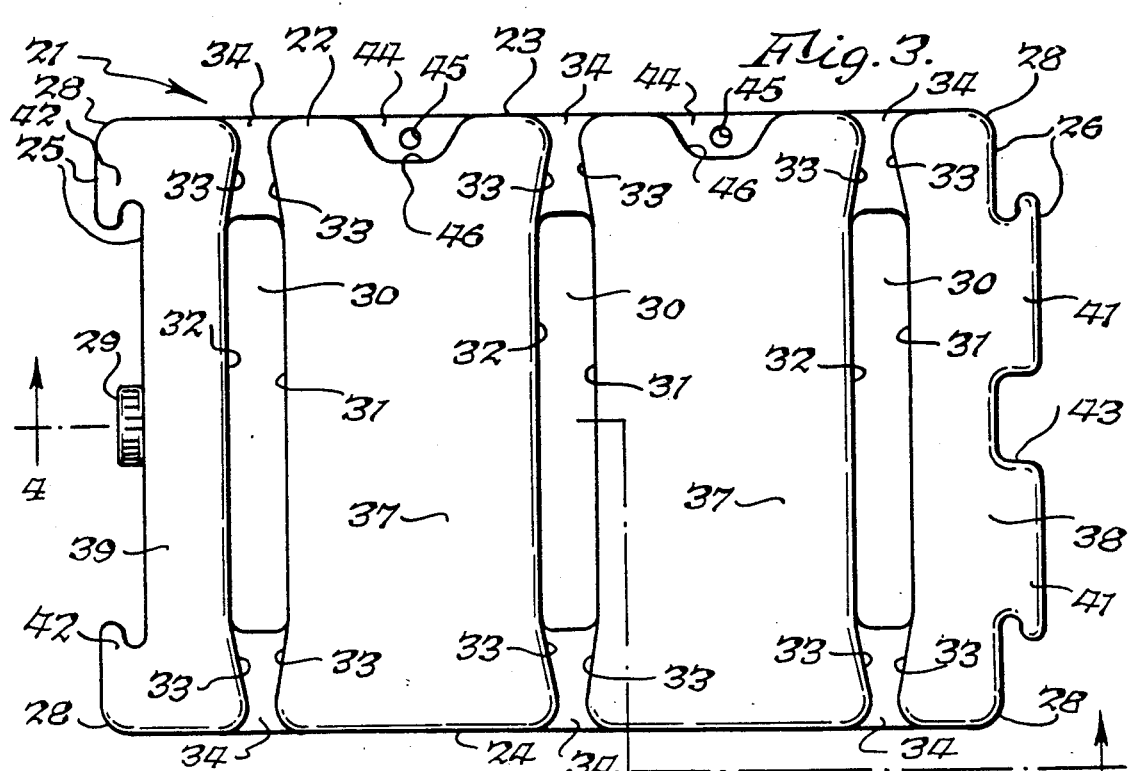
FIG. 3 is a top plan view of the form of the bicycle stand of FIG. 2.
Figure 4:
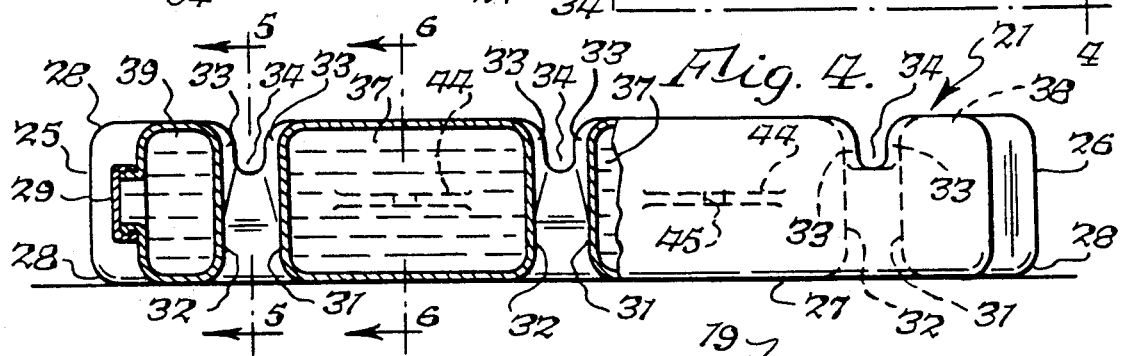
FIG. 4 is a side elevational view of the form of the bicycle stand of FIG. 3, with partial section view on line 4—4 in FIG. 3.
Figure 5:
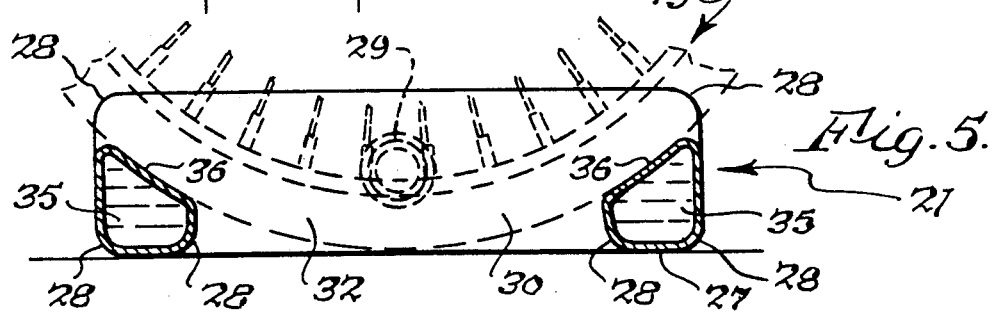
FIG. 5 is a sectional view of the form of the bicycle stand of FIG. 4 on the line 5—5 in FIG. 4.
Figure 6:
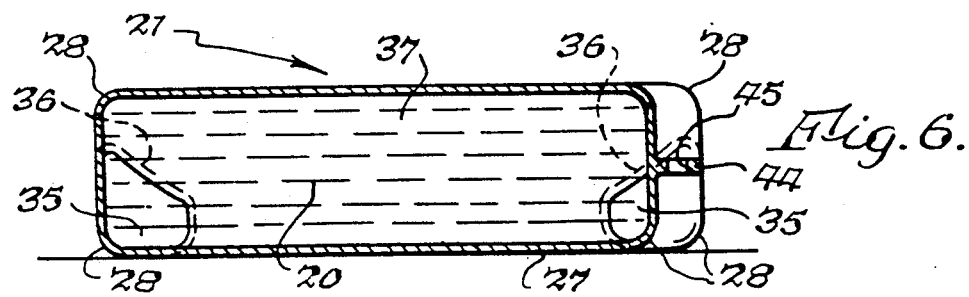
FIG. 6 is a sectional view of the form of the bicycle stand of FIG. 4 on the line 6—6 in FIG. 4.

Referring now to FIG. 2, which comprises a perspective view of an interlocking unitary structure embodiment of a bicycle stand of the invention and FIGS. 3–6, which are additional views thereof. Like numerals refer to the same structuers in each of FIGS. 2–6.

The interlocking unit generally denoted as bicycle stand body 21, comprises top surface 22, side surfaces 23 and 24, end surfaces 25 and 26 and lower surface 27 meeting at radials 28 to form the hollow bicycle stand body 21. The structure is fillable with flowable material 20 through filling means 29.

Bicycle wheel retaining slots 30 are generally equally interspaced from each other, with their length typically extending throughout the width of the top surface of the hollow bicycle stand body 21 and forming multiple interconnected chambers 3, 38 and 39 therein. The wheel retaining slots 30 extend downwardly from the top surface 22 through the hollow body 21 and through the lower surface 27. Wheel retaining slots 30 comprise opposing longitudinal side walls 31 and 32, interconnecting with the top and lower surfaces of the bicycle stand body. The longitudinal side walls are generally parallel throughout the medial portion of their length and taper(bevel) 33 toward each other at the distal ends 34 of the slots 30. The distal ends of the slots are generally open through at least a portion of side surfaces, but should not be open through the entire side surface depth. The distal ends 34 of wheel slots 30 of FIG. 2 are open through the top of side surfaces 23 and 24 thus forming hollow chambers 37 between wheel slots and hollow chambers 38 and 39 between wheel slots and the end walls of the hollow bicycle stand body. The lower corners of wheel slots 30 culminate at hollow passageways 35 which interconnect the multiple hollow chambers 37, 38 and 39 comprising fillable hollow bicycle stand body 21. Passageway surface 36 of passageway 35 is angled downwardly from the side surfaces toward the lower surface 27 to allow a bicycle wheel 19 to ride easily into the wheel slots. The slot extends through lower surface 27 of the body to allow drainage of rain water and the like.

Hollow chamber 38 comprises male interlocking means 41 at end surface 26, while hollow chamber 39 comprises a female interlocking means 42 at end surface 25 which is configured to interlockingly accept means 41 of another unit. Matching of male/female interlocking means on a single unit allows ganging of matching units to form a composite structure. In the embodiment illustrated in FIGS. 2–6, filling means 29 protrudes from end surface 25 with female interlocking means 42. Male interlocking means 41 comprises a slot 43 which will slidably accept filling means 29. Such configuration of male/female interlocking means allows the male interlocking means to slide downward into the female interlocking means without restriction from the filling means.

Bicycle securing means 44 is configured with a hole 45 of adequate size to allow a chain, lock or similar type bicycle security device to be removably attached to the bicycle stand. The configuration of indenting 46 one or more of hollow chambers 37 and providing a rigid material flap between surfaces of the indentation to form the bicycle securing means 44 provides added strength to the securing means and security from leakage of any flowable material contained in the unit due to damages that might be incurred by stressing the hole accepting the security device used by the bicyclist.

The filling means can be any suitable means to obtain entry to the hollow interior of the chamber. Typically it comprises a screw cap, compression cap or like type arrangement which would allow at least partial filling of the hollow interior of the chamber with a flowable material such as sand, cement, fluids and the like. In general, it is preferred to arrange the filling means so that it is generally flush with the surface on which it may be located so as to discourage accidental or intentional abuse to the filling means and undesired release of any flowable material therein.

Generally, the filling means can be located on any available surface of the chamber body. In circumstances wherein the hollow chamber body is to be filled with material that might harden, at least in part such as cement, concrete, fluid gels and the like, it may be desirable to locate the filling means on a top surface. In circumstances wherein the filling material is desired to be maintained flowable, such as fluids or particulate material such as sand and the like, it may be desirable to locate the filling means on the lower surface to discourage tampering or the like. Location of the filling means on a side or end surface, as illustrated in the figures, has the advantage of convenient emptying.

The wheel slots, extend through the top surface of the hollow body to the lower surface and define the chambers. Generally, the slots, at or near the top surface of the hollow body, should be from about 8 to about 28 inches or more in length and generally it is preferred that all wheel slots in a unit be of the same approximate length. It should be understood however that the invention specifically includes embodiments with wheel slots of varying lengths and/or widths in a single unit.

Opposing longitudinal sides of the slot, that is those sides formed between the upper surface of the chamber body where the long sides of the slot meet the upper surface of the unit and extending through to the lower surface, should be generally parallel throughout the medial portion of their length and taper or bevel toward each other at the distal ends of the slot. Generally, the distance between the longitudinal sides, throughout the parallel portion of their length, should be from about 10/16 inches to about 3 inches. Typically, at a point from about 5 and preferably 3 inches or less from the distal end of the slot, at least one of the longitudinal sides of the slot begins to taper or bevel toward the other opposing longitudinal side. Either or both longitudinal sides may be tapered toward the other opposing side and at either or both distal ends.

Generally, it is also preferred that the longitudinal side walls of the slot be maintained generally parallel throughout the depth of the unit body, however embodiments are envisioned wherein the side walls also converge toward each other in a taper or bevel at or near the lower surface. Convergence of the side walls toward each other at or near the lower surface of the unit body can act to provide additional holding support to a resilient tire so that it is held in the upright position at both the bottom and at least one distal end of the slot. Such tapering, however, may not be appropriate for certain intended utilities as narrower tires have a tendency to be excessively jammed into such tapers creating a problem in removing the wheel from the stand. Such problem is typical with younger children as they tend to ride the bicycle into the slot and their weight forces the tire so deep into such taper that they are unable to easily remove the wheel from the stand. The act of riding the bicycle into the tapered distal ends does not appear to present the same problem.

Each slot should be at least about 1 and one half inches deep, preferably between about 2 and about 6 inches deep, with the length of the slot at the lower surface of the stand body being the same or different from its length at the upper surface of the body. Generally, it has been found preferable that the lower surface slot length be less than the upper surface length so that interior end wall surfaces which are formed at the slot distal ends are at an angle to the vertical when the stand sits on a horizontal surface. When such interior distal end walls are at an angle to the vertical, upper surface/distal wall edges, which are normally subjected to significant abrasion by tires being rolled into the slot, are formed from an acute instead of a right or obtuse angle thereby increasing the protrusion of corner edges at the upper surface and the severity of the abrasion caused by rubbing. Obtuse angulation with the upper surface, particularly when coupled with the obtuse angulation of the tapered sides meeting the distal end walls, also has strength advantages when using typical blow-molding techniques in that obtuse angled blow-molded material has reduced corner stretch and accordingly greater material thickness and strength than right or acute angled material. For the same reasons of thickness and strength, it is generally preferred that all corners and edges of the bicycle stand of the invention, at least those subjected to unusual abrasion and wear, be formed on a radial. It should be understood that the distal ends of a slot are preferably open toward the upper surface of the body and closed toward the lower surface, culminating in distal end walls toward the lower surface of the body.

A most preferred wheel retaining slot has an upper surface slot length at least 10% or more longer than the lower surface slot length. Generally, the distal walls can be in a straight plane from the upper surface slot to the lower surface, however, one embodiment of the invention provides that the distal walls be curved to generally conform to the curvature of a typical bicycle wheel.

The bicycle stand of the invention may also contain means for securing the stand in place, and/or means for attaching bicycle security locking devices thereto. Generally, it is adequate to simply provide strategically placed attachment loops, holes and the like in the stand structure through which securing devices such as bolts, chains, locks or the like can be secured for locking the bicycle to the stand or securing the stand to the ground or a convenient fixture. In a preferred embodiment of the invention, each wheel retaining slot has a means adjacent the slot for attaching bicycle securing devices thereto.

The bicycle stand of the invention can be manufactured from any appropriate material. Particularly preferred materials, however are plastic materials, including filled plastics, and the like. By plastic material is meant any material which can be molded, cast, modeled, shaped, blown or otherwise formed to produce the unitary hollow structure of the invention. Preferred plastics comprise any of the large group of organic materials of high molecular weight usually produced synthetically or semi-synthetically by polymerization or condensation techniques or derived from natural materials by chemical treatment. Typical plastics useful in the manufacture of the device of the invention include the thermoplastic and thermosetting resins such as polyethylene, polyvinylchloride, cellulose acetates, phenol-formaldehydes and can also include the various synthetic rubbers. Various filler materials, such as fiberglas and the like, may be used, the selection of plastic and filler materials being in large part determined by availability and the specific technique of manufacture. For many of the embodiments of the invention it has been found that a superior means of manufacturing is through conventional blow-molding techniques, thus, typically any of the plastics suitable for blow-molding techniques are suitable materials for the device. It should be understood however that any method of manufacture of the device of the invention is meant to be included herein, including molding and welding of appropriate materials.

With the utilization of plastic materials, the device can accordingly be made in any color and the material may comprise any of the myriad of additives, fillers and the like used with such material.

What is claimed is:

1. A stand, for supporting bicycle wheels, comprising at least one unitary chambered, at least partially hollowed, body with side, top and bottom surfaces, said body comprising multiple parallel elongated wheel retaining slots, said slots extending through the bottom and a side surface of said body and having opposing side walls extending inwardly from the top surface towards the bottom and side surface of said body, at least one wall of said elongated retaining slot being gradually tapered to converge toward an opposing side wall at a distal end, to accept and removably grip a resilient tire therebetween.

2. A stand of claim 1 wherein said hollow body comprises a filling means assessable to at least a part of the hollow interior of the body.

3. A stand of claim 1 comprising at least two wheel retaining slots.

4. A stand of claim 2 comprising at least two wheel retaining slots.

5. A stand of claim 1 wherein said chambered body comprises means to interlock with at least one other hollow chamber body.

6. A stand of claim 5 comprising at least two interlocking hollow chambered bodies.

7. A stand of claim 5 comprising filling means assessable to at least part of the hollow interior of at least one hollow chamber.

8. A stand of claim 7 comprising filling means assessable to at least part of the hollow interior of each hollow chamber.

9. A stand of claim 7 wherein at least one said chamber comprises at least two elongated slots.

10. A stand of claim 8 wherein at least one said chamber comprises at least two elongated slots.

11. A stand of claim 9 wherein said elongated slots are from about 8 to about 28 inches long and from about 10/16 to about 3 inches wide.

12. A stand of claim 10 wherein said elongated slots are from about 8 to about 28 inches long and from about 10/16 to about 3 inches wide.

13. A stand of claim 1 comprising blow-molded plastic.

14. A stand comprising at least one hollow unitary chambered body with side, top and bottom surfaces, having an elongated wheel retaining slot extending from the top surface through the bottom surface of at least one chamber, the side walls of said elongated retaining slot being generally parallel to each other throughout their medial length and depth from the top to the bottom surface of the chamber and being gradually tapered, to generally converge toward each other, at the distal end walls to accept and removably grip a resilient tire therebetween.

15. A stand of claim 14 wherein said hollow chamber comprises a filling means assessable to at least a part of the hollow interior of the chamber.

16. A stand of claim 14 comprising at least two wheel retaining slots.

17. A stand of claim 15 comprising at least two wheel retaining slots.

18. A stand of claim 14 wherein said chambered body comprises means to interlock with at least one other hollow chambered body.

19. A stand of claim 18 comprising at least two interlocking hollow chambered bodies.

20. A stand of claim 19 comprising filling means assessable to at least part of the hollow interior of at least one hollow chamber.

21. A stand of claim 20 comprising filling means assessable to at least part of the hollow interior of each hollow chamber.

22. A stand of claim 21 wherein at least one said chamber comprises at least two elongated slots.

23. A stand of claim 21 wherein at least one said chamber comprises at least two elongated slots.

24. A stand of claim 22 wherein said elongated slots are from about 8 to about 28 inches long and from about 10/16 to about 3 inches wide.

25. A stand of claim 23 wherein said elongated slots are from about 8 to about 28 inches long and from about 10/16 to about 3 inches wide.

26. A stand of claim 14 comprising blow-molded plastic.

27. A stand of claim 1 wherein said slot comprises first and second distal ends and said opposing side walls are tapered to converge toward one another at said first and second distal end.

28. A stand for supporting bicycle wheels comprising a body with side, top and bottom surfaces, an elongated wheel retaining slot extending through the bottom and a side surface of said body, said slot having opposing side walls extending inwardly from the top surface towards the bottom and side surface of said body, at least one wall of said elongated retaining slot being gradually tapered to converge toward an opposing side wall at a distal end, to accept and removably grip a resilient tire therebetween.

* * * * *

UNITED STATES PATENT AND TRADEMARK OFFICE
CERTIFICATE OF CORRECTION

PATENT NO. : 5,036,986

DATED : August 6, 1991

INVENTOR(S) : Albertus J. Kral

It is certified that error appears in the above-identified patent and that said Letters Patent is hereby corrected as shown below:

Col. 6, line 48 - "assessable" should be --accessible--.

Col. 6, lines 59-60 - "assessable" should be --accessible--.

Col. 6, lines 62-63 - "assessable" should be --accessible--.

Col. 7, line 22 - "assessable" should be --accessible--.

Col. 8, lines 1-2 - "assessable" should be --accessible--.

Col. 8, lines 4-5 - "assessable" should be --accessible--.

Signed and Sealed this

Twenty-ninth Day of December, 1992

Attest:

DOUGLAS B. COMER

*Attesting Officer*　　　*Acting Commissioner of Patents and Trademarks*